United States Patent
Kawade

(10) Patent No.: US 8,599,713 B2
(45) Date of Patent: Dec. 3, 2013

(54) COMMUNICATION APPARATUS AND METHOD OF CONTROLLING SAME

(75) Inventor: Takahisa Kawade, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 302 days.

(21) Appl. No.: 13/111,348

(22) Filed: May 19, 2011

(65) Prior Publication Data
US 2012/0002562 A1 Jan. 5, 2012

(30) Foreign Application Priority Data
Jun. 30, 2010 (JP) .................................. 2010-150263

(51) Int. Cl.
*H04J 1/16* (2006.01)
(52) U.S. Cl.
USPC .................................. 370/252; 710/8; 710/15
(58) Field of Classification Search
USPC .................... 370/252, 229, 230; 710/15, 8
See application file for complete search history.

(56) References Cited

U.S. PATENT DOCUMENTS 8,255,583 B2* 8/2012 Oh .................................. 710/15
2010/0289530 A1 11/2010 Nakajima et al.

FOREIGN PATENT DOCUMENTS

JP 06-037675 2/1994
WO 2008-056719 A1 5/2008

* cited by examiner

*Primary Examiner* — Dady Chery
(74) *Attorney, Agent, or Firm* — Cowan, Liebowitz & Latman, P.C.

(57) ABSTRACT

There is provided a communication apparatus capable of performing HEAC communication with another communication apparatus compliant with HEAC communication, comprising: a receiving unit configured to receive an HEC signal from the other communication apparatus via a transmission path; a detecting unit configured to detect a signal level of the HEC signal received by the receiving unit; a deciding unit configured to decide an amplification factor of an HEC signal to be transmitted based upon the detected signal level in a case where the detected signal level is not within prescribed limits; an amplifying unit configured to amplify the HEC signal to be transmitted at the decided amplification factor; and a transmitting unit configured to transmit an HEAC signal, which includes an ARC signal and the HEC signal to be transmitted amplified by the amplifying unit, to the other communication apparatus via the transmission path.

16 Claims, 6 Drawing Sheets

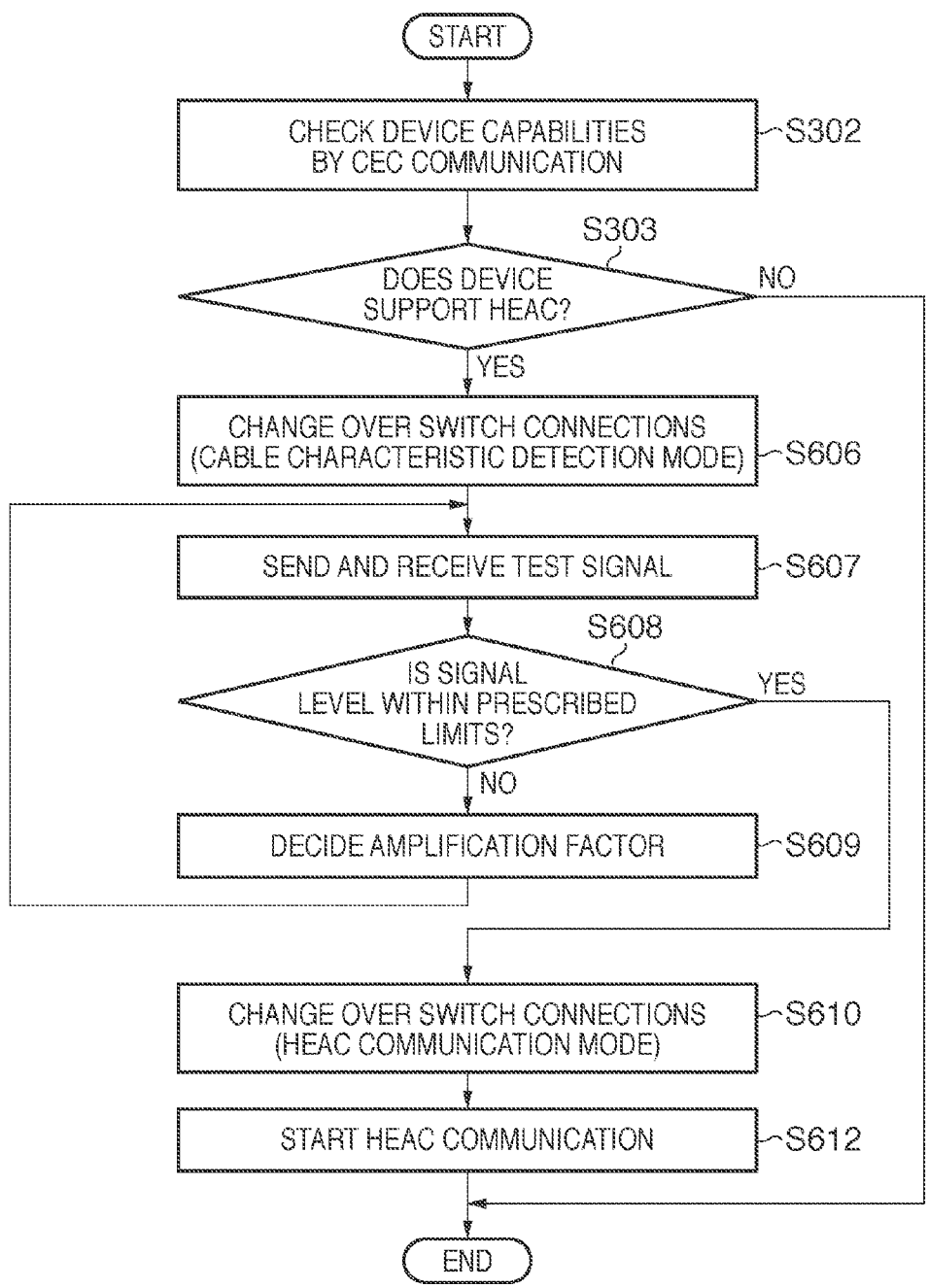

COMMUNICATION APPARATUS AND METHOD OF CONTROLLING SAME

BACKGROUND OF THE INVENTION

1. Field of the Invention

The present invention relates to a communication apparatus and to a method of controlling the same.

2. Description of the Related Art

The HDMI 1.4 specification provides for an additional high-speed communication channel (HEAC: HDMI Ethernet and Audio Return Channel) for implementing an Ethernet (registered trademark) communication channel (HEC: HDMI Ethernet Channel) and an audio return channel (ARC: Audio Return Channel). With regard to cable specifications as well, this has been accompanied by the addition of CAT-1 wHEAC and CAT-2 wHEAC, which make possible high-speed communication equivalent to 100 Base-Tx, to the conventional CAT-1/CAT-2. Since the cables conforming to these four types of specifications are all identical in shape, their specifications cannot be distinguished visually.

Further, according to the HDMI 1.4 specification, a source device and a sink device are capable of verifying each other's device capabilities (HEAC function operative/inoperative) by CDC communication via a CEC line. A method of sensing the HDMI cable specification, however, has not been defined.

For this reason, even if a source device and a sink device have been connected by a "poor-quality cable" or "HEAC non-compliant cable", this cannot be sensed. In such case, even if the source device and sink device comply with HEAC, there is a possibility that HEC communication will become unstable or impossible owing to attenuation of the HEAC signal on the transmission line.

A method of transmitting a signal upon first amplifying it beforehand by the amount of signal attenuation has been proposed as a measure to deal with signal attenuation on a transmission line (see the specification of Japanese Patent Laid-Open No. 6-37675).

However, signals of multiple types (an HEC signal and ARC signal) are superimposed upon an HEAC signal. As a consequence, when the above-mentioned technique is applied to HEAC communication to amplify the HEAC signal, there is a possibility that even if one of the HEC and ARC signals is amplified suitably, the other signal will be amplified excessively and communication failure will occur. For example, in a case where the amplification factor is decided and the HEAC signal amplified in such a manner that stable HEC communication becomes possible, HEC communication will become possible by amplifying the HEC signal to the appropriate level. However, there is a possibility that the ARC signal will be amplified excessively.

SUMMARY OF THE INVENTION

The present invention has been devised in view of these circumstances and provides a technique for improving the communication quality of HEC communication while suppressing adverse effects upon ARC communication.

According to a first aspect of the present invention, there is provided a communication apparatus capable of performing HEAC (HDMI Ethernet and Audio Return Channel) communication with another communication apparatus compliant with HEAC communication, comprising: a receiving unit configured to receive an HEC (HDMI Ethernet Channel) signal from the other communication apparatus via a transmission path; a detecting unit configured to detect a signal level of the HEC signal received by the receiving unit; a deciding unit configured to decide an amplification factor of an HEC signal to be transmitted, which is a signal to be transmitted to the other communication apparatus, based upon the detected signal level in a case where the detected signal level is not within prescribed limits; an amplifying unit configured to amplify the HEC signal to be transmitted at the decided amplification factor; and a transmitting unit configured to transmit an HEAC signal, which includes an ARC (Audio Return Channel) signal and the HEC signal to be transmitted amplified by the amplifying unit, to the other communication apparatus via the transmission path.

According to a second aspect of the present invention, there is provided a communication apparatus capable of performing HEAC (HDMI Ethernet and Audio Return Channel) communication with another communication apparatus compliant with HEAC communication, comprising: a generating unit configured to generate a test signal; a first transmitting unit configured to transmit the test signal, which has been generated by the generating unit, to the other communication apparatus via a first transmission path; a receiving unit configured to receive the test signal, which has been transmitted by the first transmitting unit, from the other communication apparatus via a second transmission path; a detecting unit configured to detect a signal level of the test signal received by the receiving unit; a deciding unit configured to decide an amplification factor of an HEC (HDMI Ethernet Channel) signal to be transmitted, which is a signal to be transmitted to the other communication apparatus, based upon the detected signal level in a case where the detected signal level is not within prescribed limits; an amplifying unit configured to amplify the HEC signal to be transmitted at the decided amplification factor; and a second transmitting unit configured to transmit an HEAC signal, which includes an ARC (Audio Return Channel) signal and the HEC signal to be transmitted amplified by the amplifying unit, to the other communication apparatus via the first transmission path and the second transmission path.

According to a third aspect of the present invention, there is provided a method of controlling a communication apparatus capable of performing HEAC (HDMI Ethernet and Audio Return Channel) communication with another communication apparatus compliant with HEAC communication, the method comprising: a receiving step of receiving an HEC (HDMI Ethernet Channel) signal from the other communication apparatus via a transmission path; a detecting step of detecting a signal level of the HEC signal received at the receiving step; a deciding step of deciding an amplification factor of an HEC signal to be transmitted, which is a signal to be transmitted to the other communication apparatus, based upon the detected signal level in a case where the detected signal level is not within prescribed limits; an amplifying step of amplifying the HEC signal to be transmitted at the decided amplification factor; and a transmitting step of transmitting an HEAC signal, which includes an ARC (Audio Return Channel) signal and the HEC signal to be transmitted amplified at the amplifying step, to the other communication apparatus via the transmission path.

According to a fourth aspect of the present invention, there is provided a method of controlling a communication apparatus capable of performing HEAC (HDMI Ethernet and Audio Return Channel) communication with another communication apparatus compliant with HEAC communication, the method comprising: a generating step of generating a test signal; a first transmitting step of transmitting the test signal, which has been generated at the generating step, to the other communication apparatus via a first transmission path; a receiving step of receiving the test signal, which has been transmitted at the first transmitting step, from the other communication apparatus via a second transmission path; a detecting step of detecting a signal level of the test signal received at the receiving step; a deciding step of deciding an amplification factor of an HEC (HDMI Ethernet Channel) signal to be transmitted, which is a signal to be transmitted to the other communication apparatus, based upon the detected signal level in a case where the detected signal level is not within prescribed limits; an amplifying step of amplifying the HEC signal to be transmitted at the decided amplification factor; and a second transmitting step of transmitting an HEAC signal, which includes an ARC (Audio Return Channel) signal and the HEC signal to be transmitted amplified at the amplifying step, to the other communication apparatus via the first transmission path and the second transmission path.

By virtue of the arrangement described above it is possible to improve the communication quality of HEC communication while suppressing adverse effects upon ARC communication.

Further features of the present invention will become apparent from the following description of exemplary embodiments (with reference to the attached drawings).

BRIEF DESCRIPTION OF THE DRAWINGS

FIG. 6 is a flowchart illustrating the operation of the sink device 100 according to the second embodiment.

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

First Embodiment

Figure 1:
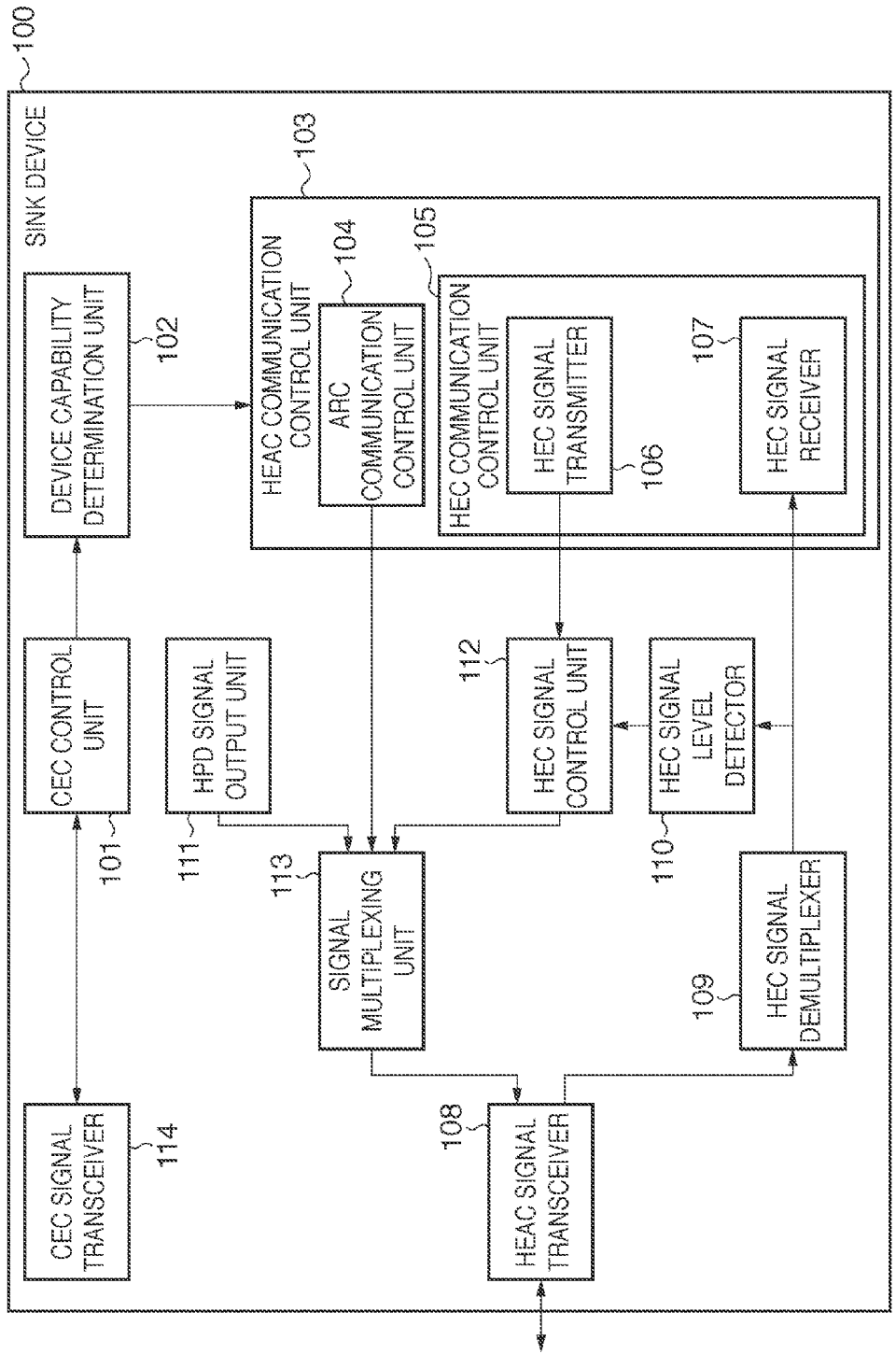
FIG. 1 is a functional block diagram illustrating a sink device 100 according to a first embodiment of the present invention.

An embodiment in which a communication apparatus according to the present invention is applied to an HDMI sink device will be described. The communication apparatus of the present invention is capable of performing HEAC communication with another communication apparatus that complies with HEAC (HDMI Ethernet and Audio Return Channel) communication. FIG. 1 is a functional block diagram illustrating a sink device 100 according to a first embodiment. A CEC signal transceiver 114 in FIG. 1 performs CEC communication with another communication apparatus (for example., a source device 200 described later with reference to FIG. 2) connected to it by an HDMI cable. In the case of an HDMI Type A connector, the $13^{th}$ pin is connected to the CEC signal transceiver.

A CEC control unit 101 exercises control of the CEC signal sent and received via the CEC signal transceiver 114. In this embodiment, the CEC signal is sent and received for determining whether the source device 200 connected by the HDMI cable is compliant with HEAC communication defined anew by the HDMI 1.4 specification. However, the type of CEC signal sent and received is not limited to this particular signal.

Based upon the content of the CEC signal analyzed by the CEC control unit 101, a device capability determination unit 102 determines whether the source device 200 connected by the HDMI cable is compliant with HEAC communication.

An HEAC communication control unit 103 has an ARC communication control unit 104 and an HEC communication control unit 105, and controls HEAC communication. The ARC communication control unit 104 controls ARC communication newly defined by HDMI 1.4 and outputs an ARC signal to a signal multiplexing unit 113. An audio signal can be sent from a sink device to a source device by ARC communication.

An HEC communication control unit 105 has an HEC signal transmitter 106 and an HEC signal receiver 107, and controls an HEC communication newly defined by HDMI 1.4. The HEC signal receiver 107 receives an HEC signal that has been received by an HEC signal demultiplexer 109. In accordance with control by the HEC communication control unit 105, the HEC signal transmitter 106 outputs an HEC signal to an HEC signal control unit 112. By utilizing HEC communication, a sink device and a source device are capable of performing bidirectional high-speed data communication with each other using Ethernet (registered trademark).

It should be noted that HEC is the abbreviation of HDMI Ethernet Channel and that ARC is the abbreviation of Audio Return Channel.

An HEAC signal transceiver 108 sends and receives an HEAC signal to and from the source device 200 connected by an HDMI cable. In the case of an HDMI Type A connector, the $14^{th}$ pin and the $19^{th}$ pin are connected to the HEAC signal transceiver 108.

The HEC signal demultiplexer 109 receives the HEC signal from the source device 200 via a transmission path implemented by the HDMI cable and the HEAC signal transceiver 108. An HEC signal level detector 110 detects the signal level of the HEC signal received by the HEC signal demultiplexer 109 and determines whether the detected signal level is within prescribed limits.

On the basis of the signal level of the HEC signal detected by the HEC signal level detector 110, the HEC signal control unit 112 controls amplification of the HEC signal (the HEC signal to be transmitted) that has been output from the HEC signal transmitter 106. If amplification is necessary, the HEC signal control unit 112 decides the amplification factor based upon the signal level of the HEC signal detected by the HEC signal level detector 110 and amplifies the HEC signal, which is to be transmitted, at this amplification factor.

An HPD signal output unit 111 outputs a Hot Plug Detect (HPD) signal for detecting plugging and unplugging of the HDMI cable.

The signal multiplexing unit 113 multiplexes the HPD signal that has been output by the HPD signal output unit 111, the ARC signal that has been output by the ARC communication control unit 104, and the HEC signal to be transmitted, which has been amplified and output by the HEC signal control unit 112. The signal multiplexing unit 113 transmits the multiplexed signals to the source device 200 via a transmission path implemented by the HDMI cable and the HEAC signal transceiver 108. Strictly speaking, an HEAC+ signal, which includes the HEC and ARC signals, is transmitted via a utility line, and the HPD signal and an HEAC− signal are transmitted via an HPD line.

Next, the functional configuration of the source device 200 will be described with reference to FIG. 2. Components in FIG. 2 having functions identical with or similar to those shown in FIG. 1 are designated by like reference numerals and need not be described again. An ARC communication control unit 204 controls ARC communication and receives an ARC signal that has been demultiplexed by a signal demultiplexer 209.

The signal demultiplexer 209 receives the signal from the sink device 100 via a transmission path implemented by the HDMI cable and the HEAC signal transceiver 108, and demultiplexes the HPD signal, HEC signal, and ARC signal from the received signal. An HPD signal monitoring unit 211 detects the HPD signal demultiplexed by the signal demultiplexer 209, thereby detecting plugging and unplugging of the HDMI cable.

The HEC signal to be transmitted, which has been amplified and output by the HEC signal control unit 112, is transmitted by an HEC signal multiplexing unit 213 to the sink device 100 via a transmission path implemented by the HDMI cable and the HEAC signal transceiver 108.

When units having the reference numerals between 101 and 114 are mentioned in the description that follows, these refer to units belonging to the sink device 100 unless stated otherwise. For example, "CEC control unit 101" indicates "CEC control unit 101 of sink device 100" unless stated otherwise.

Figure 3:
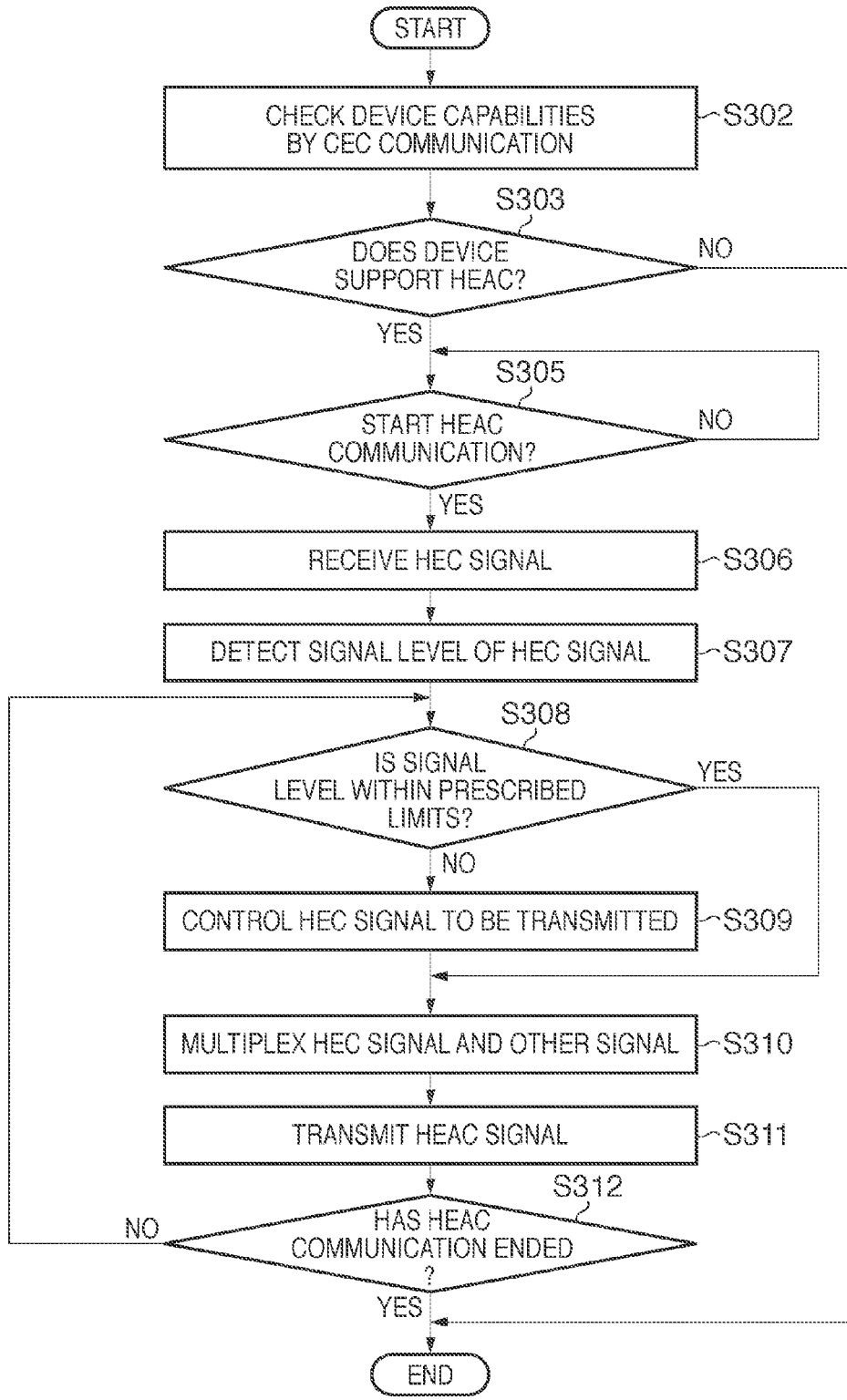
FIG. 3 is a flowchart illustrating the operation of the sink device 100 according to the first embodiment.

FIG. 3 is a flowchart illustrating the operation of the sink device 100 according to the first embodiment. The processing shown in this flowchart starts when the source device 200 is connected to the sink device 100 by the HDMI cable.

At step S302, the CEC control unit 101 checks the device capabilities of the source device 200 by CEC communication. At step S303, the device capability determination unit 102, based upon the result of the check made at step S302, determines whether the source device 200 is compliant with HEAC communication. Processing proceeds to step S305 if the source device 200 is compliant and ends if it is not.

At step S305, the sink device 100 waits for the start of HEAC communication. Processing proceeds to step S306 when HEAC communication starts. At step S306, the HEC signal demultiplexer 109 receives an HEC signal from the source device 200 via a transmission path implemented by the HDMI cable and HEAC signal transceiver 108. The HEC signal demultiplexer 109 delivers the received HEC signal to both the HEC signal level detector 110 and HEC signal receiver 107.

At step S307, the HEC signal level detector 110 detects the signal level of the HEC signal received at step S306. The detection result is passed to the HEC signal control unit 112. At step S308, the HEC signal control unit 112 determines whether the detected signal level is within prescribed limits (limits within which the execution of stable HEC communication is possible). Processing proceeds to step S310 if the signal level is within the prescribed limits and to step S309 if it is not.

At step S309, the HEC signal control unit 112, based upon the detected signal level, decides the amplification factor of the HEC signal to be transmitted (the HEC signal that has been output from the HEC signal transmitter 106) in such a manner that this HEC signal will fall within prescribed limits on the receiving side (the source device 200). Then, using the amplification factor decided, the HEC signal control unit 112 amplifies the HEC signal to be transmitted. It should be noted that an amplification factor may be less than 1, in which case the HEC signal to be transmitted will substantially attenuate.

Further, at step S309, the HEC signal control unit 112 notifies the user of the fact that the quality of the transmission path does not satisfy the requirements of HEAC communication. This notification can be achieved by displaying a message such as "HDMI CABLE QUALITY IS UNSATISFACTORY" on a display unit (not shown). This notification may be omitted if the processing of step S309 is executed after processing returns to step S308 from step S312.

At step S310, the signal multiplexing unit 113 multiplexes the ARC signal and the amplified HEC signal to be transmitted (not amplified if a "NO" decision is rendered at step S308) and generates the HEAC signal. The signal multiplexing unit 113 further superimposes an HPD signal with regard to the HPD line.

At step S311, the signal multiplexing unit 113 transmits the HEAC signal to the source device 200 via the transmission path implemented by the HDMI cable and HEAC signal transceiver 108. At step S312, the sink device 100 determines whether HEAC communication has ended. If HEAC communication has ended, the processing of this flowchart ends; otherwise, processing returns to step S308.

In accordance with this embodiment, as described above, the sink device 100 decides the amplification factor of the HEC signal, which is to be transmitted, based upon the signal level of the received HEC signal. The sink device 100 then amplifies the HEC signal to be transmitted and subsequently multiplexes and transmits the ARC signal and the amplified HEC signal to be transmitted. As a result, it is possible to improve the communication quality of HEC communication while suppressing adverse effects upon ARC communication.

Second Embodiment

In the first embodiment, the amplification factor of the HEC signal to be transmitted is decided based upon the signal level of the received HEC signal. In a second embodiment, the amplification factor of the HEC signal to be transmitted is decided based upon the signal level of a test signal rather than the received HEC signal.

Figure 4:
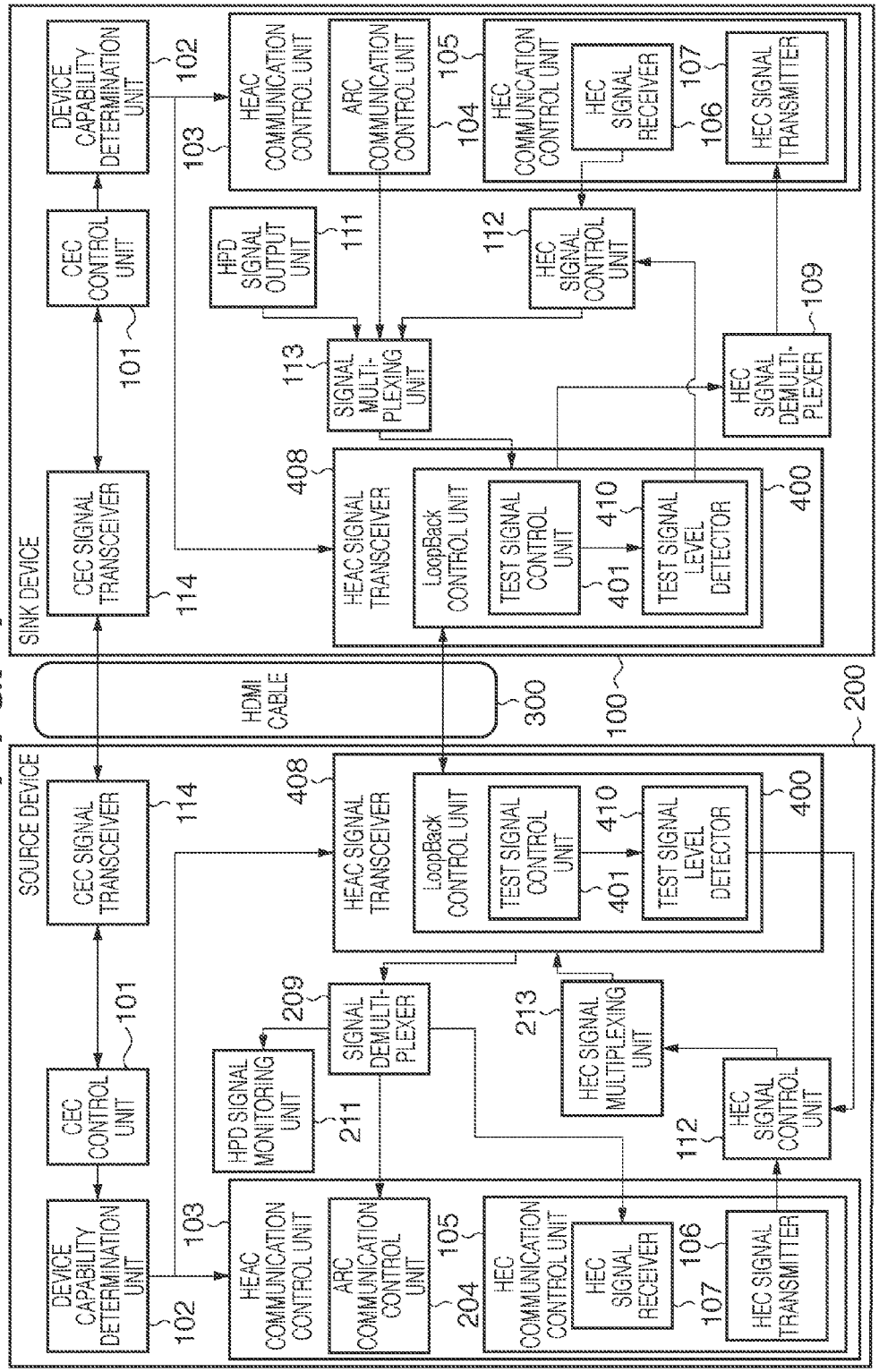
FIG. 4 is a functional block diagram illustrating a sink device 100 and a source device 200 according to a second embodiment of the present invention.

FIG. 4 is a functional block diagram illustrating the sink device 100 and the source device 200 according to the second embodiment. Components in FIG. 4 having functions identical with or similar to those shown in FIGS. 1 and 2 are designated by like reference numerals and need not be described again.

Figure 2:
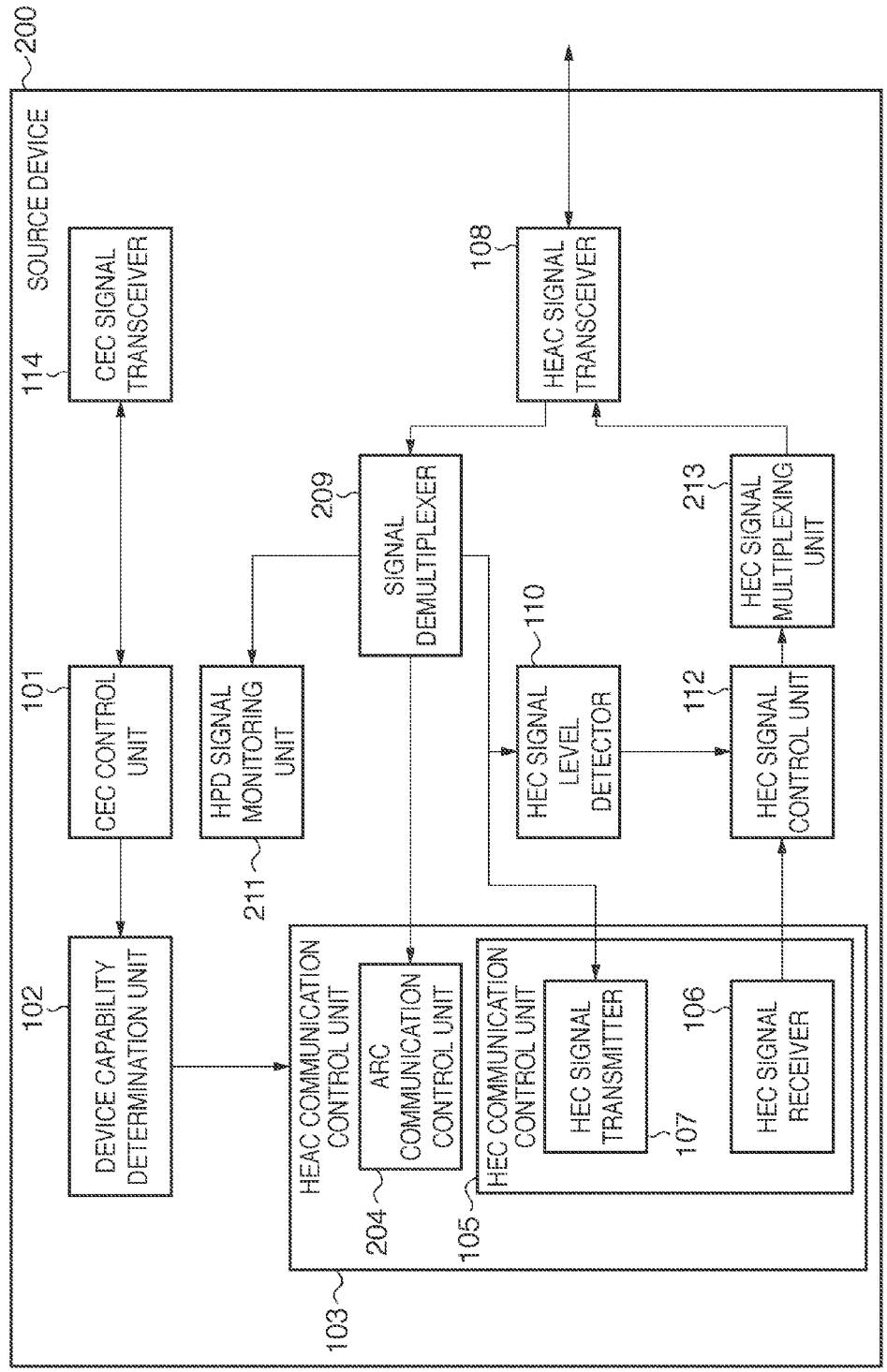
FIG. 2 is a functional block diagram illustrating a source device 200 according to the first embodiment.

In the second embodiment, as illustrated in FIG. 4, the sink device 100 and source device 200 have an HEAC signal transceiver 408 instead of the HEAC signal transceiver 108 shown in FIGS. 1 and 2. Further, the sink device 100 and source device 200 do not have the HEC signal level detector 110 shown in FIGS. 1 and 2. The sink device 100 and source device 200 are interconnected by an HDMI cable 300.

Figure 5:
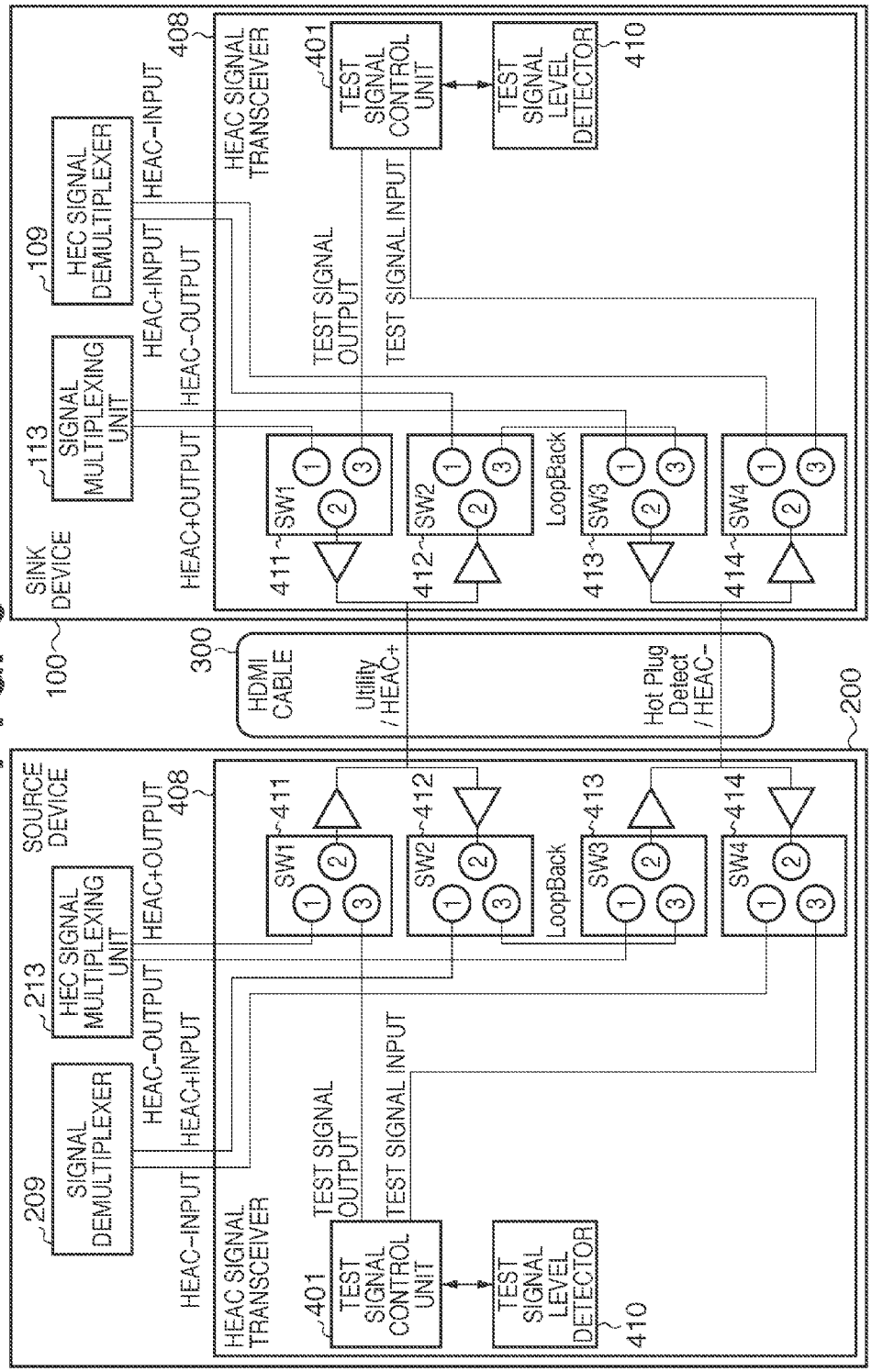
FIG. 5 is a block diagram illustrating in detail the configuration of an HEAC signal transceiver 408.

FIG. 5 is a block diagram illustrating in detail the configuration of the HEAC signal transceiver 408. As illustrated in FIG. 5, the HEAC signal transceiver 408 of the sink device 100 and the HEAC signal transceiver 408 of the source device 200 are interconnected by a utility line and an HPD line included in the HDMI cable 300. The HEAC signal transceiver 408 uses one of the utility line and HDP line to implement a first transmission path and uses the other of these lines to implement a second transmission path.

The HEAC signal transceiver 408 includes a test signal control unit 401, a test signal level detector 410 and switches 411 to 414.

The HEAC signal transceiver 408 has two operating modes, namely an HEAC communication mode and a cable characteristic detection mode. The HEAC communication mode is an operating mode for performing HEAC communication. The cable characteristic detection mode is an operating mode for deciding the amplification factor of the HEC signal to be transmitted.

In the case of the HEAC communication mode, (1) and (2) are connected and (3) and (2) are disconnected in the switches 411 to 414. In the cable characteristic detection mode, (3) and (2) are connected and (1) and (2) disconnected in the switches 411 to 414.

The test signal control unit 401 of sink device 100 generates a test signal in the cable characteristic detection mode, transmits the test signal to the source device 200 via the first transmission path, and receives a transmitted test signal from the source device 200 via the second transmission path.

In the example of FIG. 5, the test signal arrives at the source device 200 across (3) and (2) of switch 411 in sink device 100 and through the utility line. The signal returns to the sink device 100 across (2) and (3) of switch 412 in source device 200, across (3) and (2) of switch 413 in source device 200, and through the HPD line. That is, the switches 412 and 413 function to receive and send back the test signal. The test signal returns to the test signal control unit 401 through (2) and (3) of switch 414 in the sink device 100. The test signal control unit 401 of the sink device 100 passes the returned test signal to the test signal level detector 410.

The test signal is a signal having a frequency and amplitude used in HEAC communication, by way of example. However, the test signal may be any signal as long as it is a signal that makes it possible to specify the characteristic (signal-level attenuation characteristic) of the HDMI cable 300.

The operation of the test signal control unit 401 of source device 200 is similar to that of the test signal control unit 401 of sink device 100 except for the fact that the test signal originates from and returns to the source device 200.

When units having the reference numerals between 401 and 414 are mentioned in the description that follows, these refer to units belonging to the sink device 100 unless stated otherwise. For example, "HEAC signal transceiver 408" indicates "HEAC signal transceiver 408 of sink device 100" unless stated otherwise.

FIG. 6 is a flowchart illustrating the operation of the sink device 100 according to the second embodiment. Steps in FIG. 6 where processing identical with or similar to that of FIG. 3 is executed are identified by like step numbers and need not be described again. It should be noted that although this flowchart is for describing the operation of the sink device 100, the source device 200 also is capable of executing processing similar to that of this flowchart with the exception of the fact that the ARC signal is not transmitted in HEAC communication at step S612.

At step S606, the HEAC signal transceiver 408 changes over the connections of switches 411 to 414 to a configuration for the cable characteristic detection mode. At this time, the HEAC signal transceiver 408 of the source device 200 also changes over the connections of switches 411 to 414 of the source device to a configuration for the cable characteristic detection mode.

At step S607, the test signal control unit 401 generates the test signal. The test signal control unit 401 then functions as a first transmitting unit and transmits the signal to the source device 200 via the switch 411 and utility line. The test signal control unit 401 receives the test signal, which has been sent back from the source device 200, via the HPD line and switch 414 and delivers the signal to the test signal level detector 410.

At step S608, the test signal level detector 410 detects the signal level of the test signal received at step S607. The test signal level detector 410 then determines whether the detected signal level is within prescribed limits (limits within which the execution of stable HEC communication is possible). Processing proceeds to step S610 if the signal level is within the prescribed limits and to step S609 if it is not.

At step S609, the test signal level detector 410, based upon the detected signal level, decides the amplification factor of the test signal in such a manner that the test signal that will be sent back will fall within prescribed limits. The test signal level detector 410 notifies the test signal control unit 401 and HEC signal control unit 112 of the decided amplification factor. Processing then returns to step S607. Here the test signal control unit 401 amplifies the test signal at the amplification factor of which it has been notified at step S609 and sends and receives the test signal again. The processing of steps S607 to S609 is thus executed until the test signal that has been sent back falls within the prescribed limits.

The source device 200 also executes similar processing while the sink device 100 executes the processing of steps S607 to S609.

At step S610, the HEAC signal transceiver 408 changes over the connections of the switches 411 to 414 to a configuration for the HEAC communication mode. At this time, the HEAC signal transceiver 408 of source device 200 also changes over the connections of the switches 411 to 414 of source device 200 to the configuration for the HEAC communication mode.

At step S612, the sink device 100 starts HEAC communication. Specifically, the HEC signal control unit 112 amplifies the HEC signal to be transmitted, which has been amplified at the amplification factor of which notification was given at step S609. If notification of the amplification factor has been given multiple times, the latest amplification factor is used. Amplification is not carried out if notification of the amplification factor has not been given a single time. The signal multiplexing unit 113 multiplexes the ARC signal and the HEC signal to be transmitted and generates the HEAC signal. The signal multiplexing unit 113 further superimposes the HPD signal with regard to the HPD line. The signal multiplexing unit 113 functions as a second transmitting unit and transmits the HEAC signal to the source device 200 via the first transmission path and the second transmission path (namely via the utility line and the HPD line) implemented by the HDMI cable and HEAC signal transceiver 108.

In accordance with this embodiment, as described above, the sink device 100 transmits the test signal to the source device 200 and decides the amplification factor of the HEC signal, which is to be transmitted, based upon the signal level of the test signal that has been sent back from the source device 200. The sink device 100 then amplifies the HEC signal to be transmitted and subsequently multiplexes and transmits the ARC signal and the amplified HEC signal to be transmitted. As a result, it is possible to improve the communication quality of HEC communication while suppressing adverse effects upon ARC communication.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-150263, filed on Jun. 30, 2010 which is hereby incorporated by reference herein in its entirety.

What is claimed is:

1. A communication apparatus capable of performing HEAC (HDMI Ethernet and Audio Return Channel) communication with another communication apparatus compliant with HEAC communication, comprising:
   a receiving unit configured to receive an HEC (HDMI Ethernet Channel) signal from the other communication apparatus via a transmission path;
   a detecting unit configured to detect a signal level of the HEC signal received by said receiving unit;
   a deciding unit configured to decide an amplification factor of an HEC signal to be transmitted, which is a signal to be transmitted to the other communication apparatus, based upon the detected signal level in a case where the detected signal level is not within prescribed limits;
   an ARC outputting unit configured to output an ARC (Audio Return Channel) signal to be transmitted, which is a signal to be transmitted to the other communication apparatus;
   an HEC outputting unit configured to output the HEC signal to be transmitted;
   an amplifying unit configured to amplify the HEC signal to be transmitted, which has been output by the HEC outputting unit, at the decided amplification factor;
   a generating unit configured to generate an HEAC signal by multiplexing the ARC signal to be transmitted, which has been output by the ARC outputting unit, and the HEC signal to be transmitted, which has been amplified by said amplifying unit; and
   a transmitting unit configured to transmit the HEAC signal to the other communication apparatus via the transmission path.

2. The apparatus according to claim 1, further comprising a notifying unit configured to notify a user of the fact that quality of the transmission path does not satisfy HEAC communication requirements in a case where the detected signal level is not within the prescribed limits.

3. The apparatus according to claim 1, wherein the receiving unit receives the HEC signal by separating it from an HEAC signal received from the other communication apparatus via the transmission path.

4. The apparatus according to claim 1, further comprising a determination unit configured to determine whether or not the other communication apparatus is compliant with HEAC communication based on a CEC (Consumer Electronics Control) signal received from the other communication apparatus via a second transmission path,
   wherein the receiving unit receives the HEC signal from the other communication apparatus if it is determined by the determination unit that the other communication apparatus is compliant with HEAC communication.

5. A communication apparatus capable of performing HEAC (HDMI Ethernet and Audio Return Channel) communication with another communication apparatus compliant with HEAC communication, comprising:
   a test signal generating unit configured to generate a test signal;
   a first transmitting unit configured to transmit the test signal, which has been generated by said test signal generating unit, to the other communication apparatus via a first transmission path;
   a receiving unit configured to receive the test signal, which has been transmitted by said first transmitting unit, from the other communication apparatus via a second transmission path;
   a detecting unit configured to detect a signal level of the test signal received by said receiving unit;
   a deciding unit configured to decide an amplification factor of an HEC (HDMI Ethernet Channel) signal to be transmitted, which is a signal to be transmitted to the other communication apparatus, based upon the detected signal level in a case where the detected signal level is not within prescribed limits;
   an ARC outputting unit configured to output an ARC (Audio Return Channel) signal to be transmitted, which is a signal to be transmitted to the other communication apparatus;
   an HEC outputting unit configured to output the HEC signal to be transmitted;
   an amplifying unit configured to amplify the HEC signal to be transmitted, which has been output by the HEC outputting unit, at the decided amplification factor;
   a HEAC signal generating unit configured to generate an HEAC signal by multiplexing the ARC signal to be transmitted, which has been output by the ARC outputting unit, and the HEC signal to be transmitted, which has been amplified by said amplifying unit; and
   a second transmitting unit configured to transmit the HEAC signal to the other communication apparatus via the first transmission path and the second transmission path.

6. The apparatus according to claim 5, further comprising a send-back unit configured to receive a test signal, which has been generated by the other communication apparatus, from the other communication apparatus via the first transmission path, and to transmit the received test signal to the other communication apparatus via the second transmission path.

7. The apparatus according to claim 5, further comprising:
   a switch configured to selectively pass the test signal, which has been generated by said test signal generating unit, or a part of the HEAC signal, which has been generated by said HEAC signal generating unit, to the first transmission path; and
   a switch control unit configured to cause the switch to pass the test signal when the first transmitting unit transmits the test signal to the other communication apparatus via the first transmission path.

8. The apparatus according to claim 5, further comprising a determination unit configured to determine whether or not the other communication apparatus is compliant with HEAC communication based on a CEC (Consumer Electronics Control) signal received from the other communication apparatus via a third transmission path,
   wherein the first transmitting unit transmits the test signal to the other communication apparatus via the first transmission path and the receiving unit receives the test signal from the other communication apparatus via the second transmission path, if it is determined by the determination unit that the other communication apparatus is compliant with HEAC communication.

9. A method of controlling a communication apparatus capable of performing HEAC (HDMI Ethernet and Audio Return Channel) communication with another communication apparatus compliant with HEAC communication, said method comprising:
- a receiving step of receiving an HEC (HDMI Ethernet Channel) signal from the other communication apparatus via a transmission path;
- a detecting step of detecting a signal level of the HEC signal received at said receiving step;
- a deciding step of deciding an amplification factor of an HEC signal to be transmitted, which is a signal to be transmitted to the other communication apparatus, based upon the detected signal level in a case where the detected signal level is not within prescribed limits;
- an ARC outputting step of outputting an ARC (Audio Return Channel) signal to be transmitted, which is a signal to be transmitted to the other communication apparatus;
- an HEC outputting step unit of outputting the HEC signal to be transmitted;
- an amplifying step of amplifying the HEC signal to be transmitted, which has been output by the HEC outputting step, at the decided amplification factor;
- a generating unit step of generating an HEAC signal by multiplexing the ARC signal to be transmitted, which has been output at the ARC outputting step, and the HEC signal to be transmitted, which has been amplified at said amplifying step; and
- a transmitting step of transmitting the HEAC signal to the other communication apparatus via the transmission path.

10. The method according to claim 9, further comprising a notifying step of notifying a user of the fact that quality of the transmission path does not satisfy HEAC communication requirements in a case where the detected signal level is not within the prescribed limits.

11. The method according to claim 9, wherein the receiving step receives the HEC signal by separating it from an HEAC signal received from the other communication apparatus via the transmission path.

12. The method according to claim 9, further comprising a determination step of determining whether or not the other communication apparatus is compliant with HEAC communication based on a CEC (Consumer Electronics Control) signal received from the other communication apparatus via a second transmission path,
- wherein the receiving step receives the HEC signal from the other communication apparatus if it is determined at the determination step that the other communication apparatus is compliant with HEAC communication.

13. A method of controlling a communication apparatus capable of performing HEAC (HDMI Ethernet and Audio Return Channel) communication with another communication apparatus compliant with HEAC communication, said method comprising:
- a test signal generating step of generating a test signal;
- a first transmitting step of transmitting the test signal, which has been generated at said test signal generating step, to the other communication apparatus via a first transmission path;
- a receiving step of receiving the test signal, which has been transmitted at said first transmitting step, from the other communication apparatus via a second transmission path;
- a detecting step of detecting a signal level of the test signal received at said receiving step;
- a deciding step of deciding an amplification factor of an HEC (HDMI Ethernet Channel) signal to be transmitted, which is a signal to be transmitted to the other communication apparatus, based upon the detected signal level in a case where the detected signal level is not within prescribed limits;
- an ARC outputting step of outputting an ARC (Audio Return Channel) signal to be transmitted, which is a signal to be transmitted to the other communication apparatus;
- an HEC outputting step unit of outputting the HEC signal to be transmitted;
- an amplifying step of amplifying the HEC signal to be transmitted, which has been output by the HEC outputting step, at the decided amplification factor;
- an HEAC signal generating unit step of generating an HEAC signal by multiplexing the ARC signal to be transmitted, which has been output at the ARC outputting step, and the HEC signal to be transmitted, which has been amplified at said amplifying step; and
- a second transmitting step of transmitting the HEAC signal to the other communication apparatus via the first transmission path and the second transmission path.

14. The method according to claim 13, further comprising a send-back step of receiving a test signal, which has been generated by the other communication apparatus, from the other communication apparatus via the first transmission path, and transmitting the received test signal to the other communication apparatus via the second transmission path.

15. The method according to claim 13, wherein:
- the communication apparatus comprises a switch configured to selectively pass the test signal, which has been generated at said test signal generating step, or a part of the HEAC signal, which has been generated at said HEAC signal generating step, to the first transmission path; and
- the method further comprises a switch control step of causing the switch to pass the test signal when the first transmitting step transmits the test signal to the other communication apparatus via the first transmission path.

16. The method according to claim 13, further comprising a determination step of determining whether or not the other communication apparatus is compliant with HEAC communication based on a CEC (Consumer Electronics Control) signal received from the other communication apparatus via a third transmission path
- wherein the first transmitting step transmits the test signal to the other communication apparatus via the first transmission path and the receiving step receives the test signal from the other communication apparatus via the second transmission path, if it is determined at the determination step that the other communication apparatus is compliant with HEAC communication.

* * * * *